United States Patent
Oka

(10) Patent No.: US 7,847,819 B2
(45) Date of Patent: *Dec. 7, 2010

(54) MEASUREMENT SYSTEM FOR EVALUATING MOVING IMAGE QUALITY OF DISPLAYS

(75) Inventor: Koichi Oka, Otsu (JP)

(73) Assignee: Otsuka Electronics Co., Ltd., Osaka (JP)

( * ) Notice: Subject to any disclaimer, the term of this patent is extended or adjusted under 35 U.S.C. 154(b) by 1590 days.

This patent is subject to a terminal disclaimer.

(21) Appl. No.: 10/536,998

(22) PCT Filed: Jun. 6, 2003

(86) PCT No.: PCT/JP03/07178

§ 371 (c)(1),
(2), (4) Date: May 31, 2005

(87) PCT Pub. No.: WO2004/075567

PCT Pub. Date: Sep. 2, 2004

(65) Prior Publication Data

US 2006/0007313 A1 Jan. 12, 2006

(30) Foreign Application Priority Data

Feb. 21, 2003 (JP) .............................. 2003-045035

(51) Int. Cl.
*H04N 7/18* (2006.01)
*G01C 3/08* (2006.01)
(52) U.S. Cl. ..................................... 348/125; 356/5.02

(58) Field of Classification Search ................. 348/205, 348/125, 184; 356/5.04; 351/221; 439/894
See application file for complete search history.

(56) References Cited

U.S. PATENT DOCUMENTS

| 3,222,979 A | | 12/1965 | Webster |
| 3,897,150 A | * | 7/1975 | Bridges et al. ............. 356/5.04 |
| 4,692,808 A | * | 9/1987 | Chism, Jr. .................. 348/205 |
| 5,094,523 A | * | 3/1992 | Reznichenko et al. ....... 351/221 |

(Continued)

FOREIGN PATENT DOCUMENTS

GB 2 351 162 A 12/2000

(Continued)

*Primary Examiner*—Gims S Philippe
(74) *Attorney, Agent, or Firm*—Finnegan, Henderson, Farabow, Garrett & Dunner, L.L.P.

(57) ABSTRACT

A system is disclosed, which comprises a rotatable mirror 2, a camera 3 for taking an image of a screen 5 through the mirror 2, a photodetector 4 having a detection range covering a part of the screen 5, and a control section 6. At a time when a measuring pattern included in a moving image displayed on the screen 5 is detected by the photodetector 4, a detection signal is outputted from the photodetector 4. Based on the detection signal, the control section triggers the mirror 2 to rotate, and after the mirror 2 starts rotating, the control section 6 controls so that the mirror 2 rotates to follow the motion of the measuring pattern. It is possible to obtain images that trace the motion of the moving image on a detector plane of the camera 3 without resorting to electrical synchronization of the rotation of the mirror and moving image signals, and to measure the moving image quality of displays with a simple structure.

11 Claims, 15 Drawing Sheets

U.S. PATENT DOCUMENTS

2006/0160436 A1* 7/2006 Oka et al. .................. 439/894
2007/0024627 A1   2/2007 Oka et al.

FOREIGN PATENT DOCUMENTS

| | | |
|---|---|---|
| JP | 10-048155 | 2/1998 |
| JP | 2001-42845 | 2/2001 |
| JP | 2001-54147 | 2/2001 |
| JP | 2004-363798 | 12/2004 |
| WO | WO 01/60078 A1 | 8/2001 |
| WO | WO 2004/075567 A1 | 9/2004 |

* cited by examiner

MEASUREMENT SYSTEM FOR EVALUATING MOVING IMAGE QUALITY OF DISPLAYS

TECHNICAL FIELD

The present invention relates to a measurement system for evaluating moving image quality of displays which is capable of measuring and evaluating a moving image quality of displays based on the motion of a measuring pattern displayed on a screen of a display device subject to evaluation.

PRIOR ART

Evaluation of moving image quality is conducted by measuring the motion of a moving image displayed on a screen of a display device such as Liquid Crystal Display (LCD), Cathode-ray tube (CRT) display, Plasma Display Panel (PDP), or Electroluminescence (EL) display. One method of such evaluation is a process in which a camera is adapted to follow the motion of a moving image as an eyeball and take images thereof as stationary images, and the sharpness of the stationary images that have been taken is evaluated. In the case of a display device such as LCD with a long image-keeping time, in particular, the sharpness of the image deteriorates in the edges. A method in which the deterioration of the sharpness is digitized and used as an index is the method for evaluating moving image quality of displays.

There is a known conventional measurement system for evaluating moving image quality, which comprises a rotatable mirror, a camera for taking images of the screen of a display device subject to evaluation through the mirror, wherein the rotation of the mirror is controlled using synchronous signals of video signals of a moving image so as to allow the image of the screen to be taken as a stationary image. (Japanese Unexamined Patent Publication No. 2001-54147 A)

However, the aforementioned device for measuring and evaluating moving image quality needs to generate a trigger signal for triggering the mirror to rotate based on the synchronous signals of video signals of a moving image, and therefore requires development of a signal generation circuit for generating the trigger signal. Since such development takes time and costs, there is anticipation for a measurement system for evaluating moving image quality of displays that is capable of more easily triggering the mirror to rotate.

It is therefore an object of the present invention to provide a measurement system for evaluating moving image quality of displays which is capable of obtaining images that trace the motion of a moving image displayed on a screen of a display device subject to evaluation on a detector plane of an image sensor, and can be realized in a simple structure without resorting to electrical synchronization with moving image signals.

DISCLOSURE OF THE INVENTION

A measurement system for evaluating moving image quality of displays according to the present invention comprises a rotatable mirror, an image sensor for taking an image of a screen through the mirror, a rotation drive section for rotationally driving the mirror, a photodetector having a detection range covering a part of the screen, and a control section connected to the photodetector and the rotation drive section. The control section outputs a trigger signal to the rotation drive section for triggering the rotation drive section to rotate based on a detection signal from the photodetector outputted at a time when the photodetector detects a measuring pattern displayed on the screen, and controls so that the mirror rotates to follow the motion of the measuring pattern, as in Claim 1.

According to the arrangement above, a photodetector is prepared. At a time when the photodetector detects a measuring pattern included in a moving image displayed on the screen, the photodetector outputs a detection signal. Based on the detection signal, the control section triggers the rotation drive section to rotate. After the mirror starts rotating, the control section controls so that the mirror rotates to follow the motion of the measuring pattern. Accordingly, images that trace the motion of the moving image can be obtained on a detector plane of an image sensor without resorting to electrical synchronization with moving image signals.

The measuring pattern may be one that moves on the screen at a uniform velocity, as in Claim 2.

In the case of a moving pattern that moves on the screen at a uniform velocity, the control section may be one that calculates the moving velocity of the measuring pattern based on a detection signal from the photodetector, as in Claim 3.

Once the moving velocity of the measuring pattern is known, the angular velocity of the mirror that is adapted to follow the measuring pattern can be calculated. Therefore, the control section is able to control the mirror to rotate so that the mirror follows the motion of the measuring pattern.

As for the method for calculating the moving velocity of the measuring pattern, if the width of the measuring pattern is known, it can be calculated based on a time period from a time when the photodetector detects a start point of the measuring pattern to a time when the photodetector detects an end point of the measuring pattern. When the photodetector has two or more detection ranges, the calculation may be based on a time period from a time when the measuring pattern passes through one detection range to a time when the measuring pattern passes through another detection range. When the photodetector has two or more detection ranges and is capable of taking a difference in optical intensity signal between each of the detection ranges, the calculation may be based on the time period during the occurrence of the difference signal, as in Claim 4.

The measuring pattern may be one that performs reciprocating oscillation on the screen, as in Claim 5.

In the case of a measuring pattern that performs reciprocating oscillation on the screen, the control section triggers the rotation drive section to rotate based on a time at which a peak value or a bottom value of a detection signal of the photodetector is detected or a time at which a rise or decay in a detection signal is detected, as in Claim 6.

When the cycle of the reciprocating oscillation is unknown, the control section may be adapted to determine a rotation cycle for the rotation drive section based on a cycle present in a detection signal of the photodetector, as in Claim 7.

In addition, the present invention can also be implemented where a rotatable camera and a rotation drive section for rotationally driving the camera are used instead of the combination of a rotatable mirror, an image sensor for taking an image of the screen through the mirror and a rotation drive section for rotationally driving the mirror, as in Claim 8.

When the camera is of a light kind, it can be rotated to follow the motion of the measuring pattern by a small rotational driving force.

It is preferred that a measurement system for evaluating moving image quality of displays according to the present invention further comprises an illumination apparatus for illuminating the screen of the display device subject to evaluation by spot illumination, wherein the installation position and the angle of a illumination optical axis of the illumination apparatus are fixed with respect to both the photodetector and the rotation drive section, as in Claim 9. By the use of the illumination apparatus, it is possible to easily and accurately set a corresponding relationship between detection coordinates of the photodetector and coordinates on the screen of the display device subject to evaluation.

When a measurement system for evaluating moving image quality of displays according to the present invention further comprises an illumination apparatus for illuminating the screen of the display device subject to evaluation with repetitive pulses of light, an angular velocity of the mirror can be measured by measuring a distance between images of illumination light pulses projected from the illumination apparatus that are formed on a detection screen of the photodetector during rotation of the mirror, as in Claim 10.

When a measurement system for evaluating moving image quality of displays according to the present invention further comprises an illumination apparatus for illuminating the screen of the display device subject to evaluation, an exposure time of the photodetector can be measured by measuring a width of an image of illumination light projected from the illumination apparatus that is formed on a detection screen of the photodetector during rotation of the mirror, as in Claim 11.

As described so far, according to the present invention, a control is performed in such a way that at a time at which the photodetector detects a measuring pattern included in a moving image displayed on the screen, the photodetector outputs a detection signal, and the rotation drive section is triggered to rotate based on the detection signal, and the mirror rotates to follow the motion of the measuring pattern. Therefore, images that trace the motion of a moving image can be obtained on a detector plane of an image sensor without resorting to electrical synchronization with moving image signals. Accordingly, it is possible to measure and evaluate moving image quality of displays with a simple structure.

BRIEF DESCRIPTION OF THE DRAWINGS

FIG. 18(a) a graph showing a movement of a measuring pattern P in the scanning direction on the screen of the display device subject to evaluation; FIG. 18(b) a graph showing a trigger signal generated in the computer control section; FIG. 18(c) a graph showing a temporal transition of a rotation angle θ as the galvanometer mirror 2 rotates based on receipt of a rotation signal; and FIG. 18(d) a graph showing a temporal transition of an exposure value on the detector plane of the CCD camera.

BEST MODE FOR CARRYING OUT THE INVENTION

Embodiments of the present invention are now described in detail referring to the appended drawings.

<System Configuration>

Figure 1:
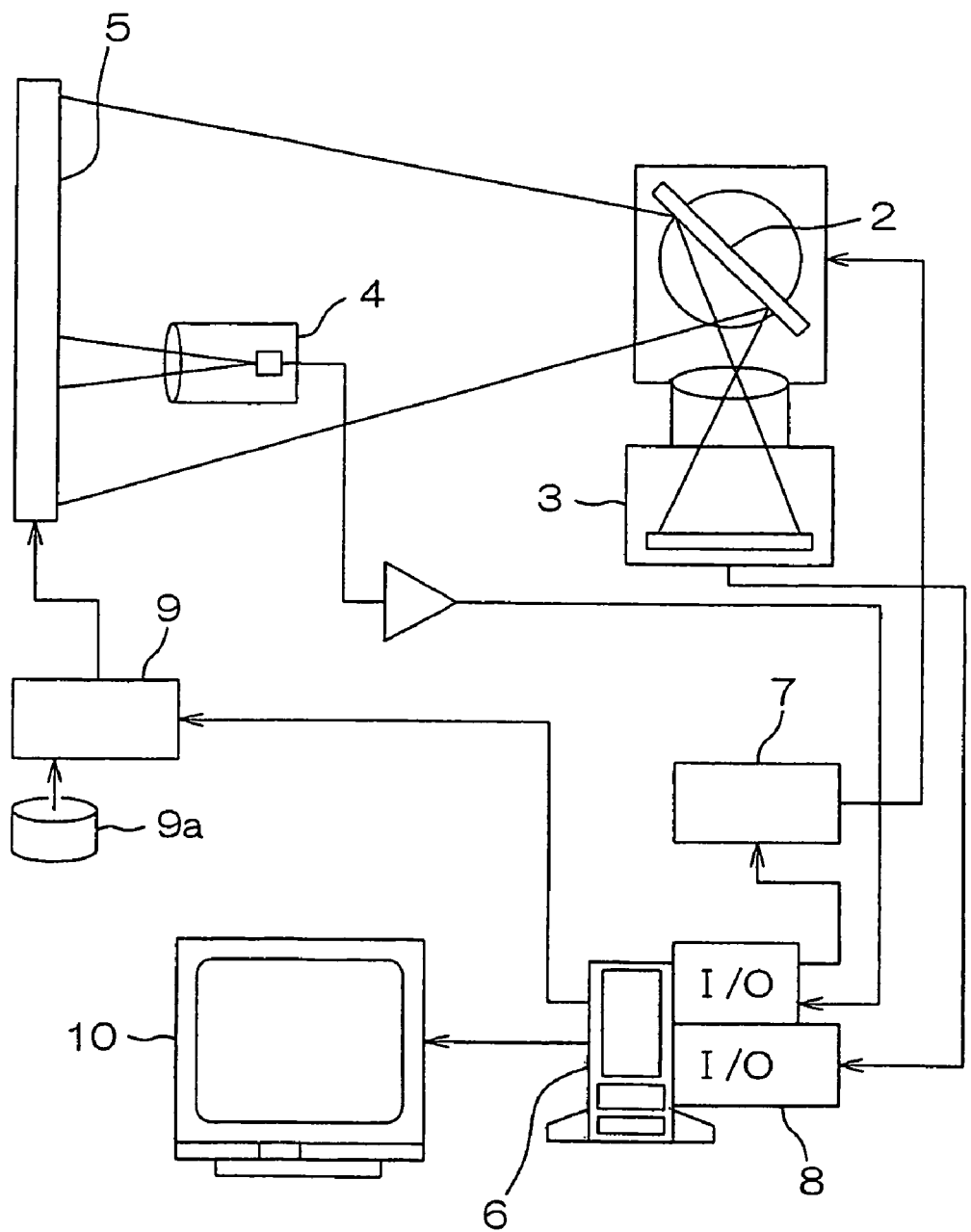
FIG. 1 is a block diagram illustrating the configuration of a measurement system for evaluating moving image quality of displays according to the present invention.

FIG. 1 is a block diagram illustrating the configuration of a measurement system for evaluating moving image quality of displays according to the present invention. The measurement system for evaluating moving image quality of displays includes a galvanometer mirror 2, a CCD camera 3 that takes images of a screen 5 of a display device subject to evaluation through the galvanometer mirror 2, and a photodetector 4 having a detection range covering a part of the screen 5.

The galvanometer mirror 2 comprises a mirror attached to the rotation axis of a permanent magnet that is disposed so as to be rotatable in a magnetic field generated when electric current flows through a coil, and the mirror is capable of rotating smoothly and speedily. The "motor" including the permanent magnet and the coil constitutes the "rotation drive section".

The photodetector 4 has a detection range covering a part of the screen 5 of the display device subject to evaluation. It measures the average luminance in the detection range in the screen 5 and outputs the resultant detection signal (analog signal) to a computer control section 6 through an I/O board equipped with a D/A converter.

The CCD camera 3 has a field of view covering a part of or the entire screen 5 of the display device subject to evaluation. The galvanometer mirror 2 is disposed between the CCD camera 3 and the screen 5 so that the field of view of the CCD camera 3 can move in a one-dimensional direction (hereinafter referred to as the "scanning direction") as the galvanometer mirror 2 rotates. A rotation signal is transmitted from the computer control section 6 to the galvanometer mirror 2 through a galvanometer mirror drive controller 7. An image signal received by the CCD camera 3 is fetched into the computer control section 6 through an I/O image capture board 8.

Meanwhile, instead of the arrangement where the galvanometer mirror 2 and the CCD camera 3 are provided independently, a CCD camera such as a lightweight digital camera itself may be situated on a rotary table so that it is rotationally driven by a rotation drive motor.

A display control signal for selecting a display screen 5 is transmitted from the computer control section 6 to an image signal generator 9 which, based on the display control signal, provides an image signal (stored in an image memory 9a) for displaying a motion of a measuring pattern to the display device subject to evaluation. In addition, a liquid crystal monitor 10 is connected to the computer control section 6.

<Calibration>

In this measurement system for evaluating moving image quality of displays, detection coordinates of the CCD camera 3 and coordinates on the screen of the display device subject to evaluation have to exactly correspond to each other. Setting for such exact correspondence by a human with a ruler or the like takes much labor and is difficult.

It is therefore necessary to facilitate the setting of the corresponding relationship between detection coordinates of the CCD camera and coordinates on the screen of the display device subject to evaluation.

Figure 2:
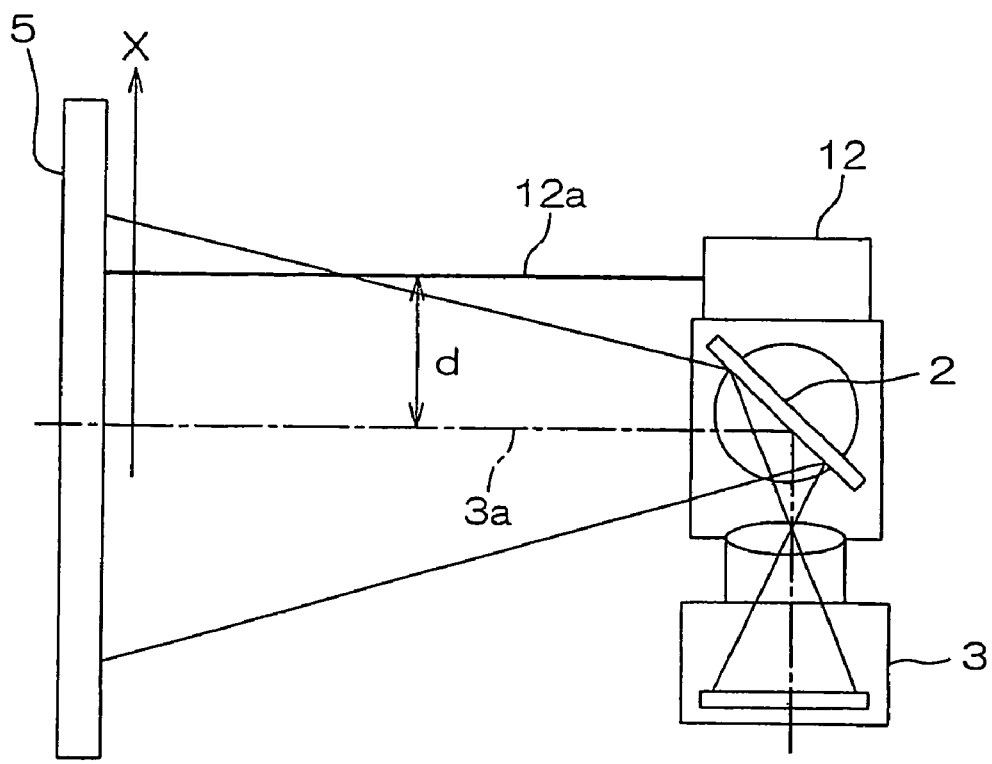
FIG. 2 is a block diagram illustrating the configuration of a measurement system for evaluating moving image quality of displays equipped with a laser oscillating apparatus 12.

FIG. 2 is a block diagram showing the configuration of a measurement system for evaluating moving image quality of displays. While a measurement system for evaluating moving image quality of displays is shown as in FIG. 1, the photodetector 4, computer control section 6, galvanometer mirror drive controller 7, image signal generator 9, and liquid crystal monitor 10 are not diagramed in FIG. 2. The CCD camera 3 and the galvanometer mirror 2 are fixed to each other.

A laser oscillating apparatus 12 is fixed to the galvanometer mirror 2. The orientation of the laser oscillating apparatus 12 is fixed so that when the angle of the galvanometer mirror 2 is set at a predetermined angle (for example, 45 degrees), the optical axis 12a of the laser oscillating apparatus 12 and the optical axis 3a of the CCD camera 3 are parallel to each other. It is assumed that the distance d between the both optical axes 3a and 12a is known.

A laser beam is launched from the laser oscillating apparatus 12 to irradiate the screen 5 so that a point at which x-coordinate is d is illuminated. Thus, the origin at which x-coordinate is 0 on the screen 5 corresponds to the optical axis 3a of the CCD camera 3.

It is also possible to verify that the coordinate of a point at which the laser beam reflected from the screen 5 is incident on the image plane of the CCD camera 3 corresponds to the coordinate of a point on the screen 5 where x-coordinate=d.

Figure 3:
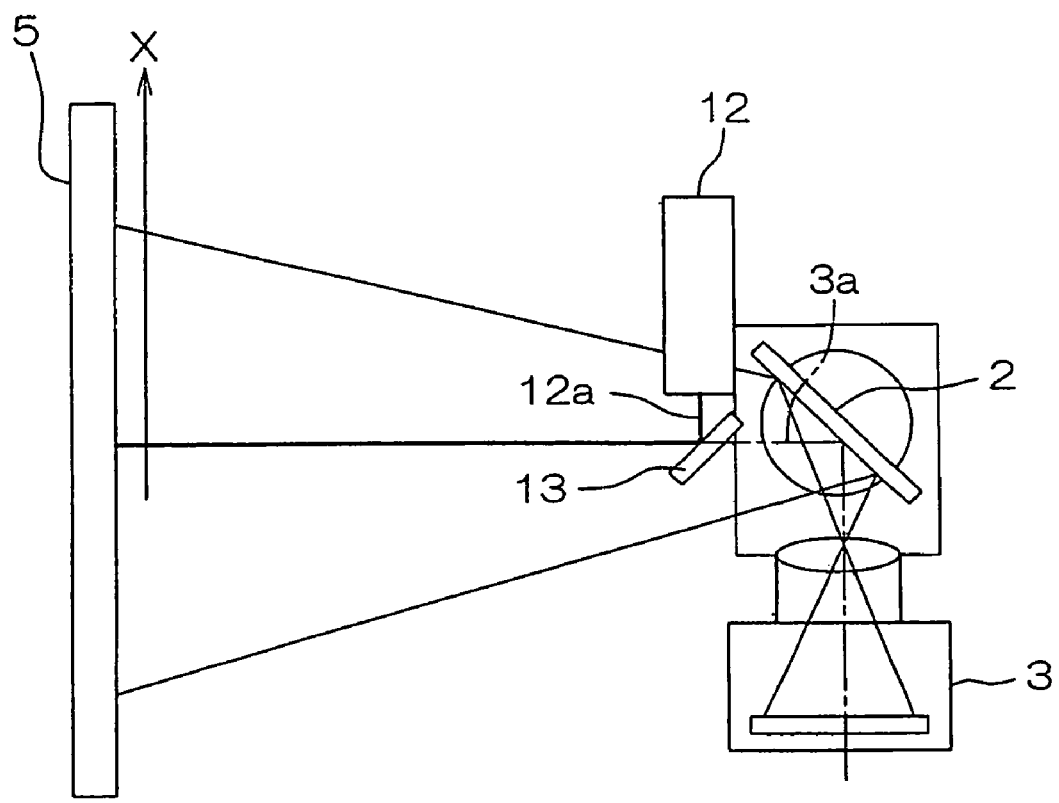
FIG. 3 is a block diagram illustrating the configuration of a measurement system for evaluating moving image quality of displays equipped with a laser oscillating apparatus 12 aligned at an angle to the optical axis of measurement set and a half mirror 13.

In FIG. 3, a laser oscillating apparatus 12 is vertically set and a half mirror 13 is disposed at a position at which the optical axis 12a of the laser oscillating apparatus 12 and the optical axis 3a of the CCD camera 3 cross when the angle of the galvanometer mirror 2 is set at a predetermined angle (for example, 45 degrees). The angle of the half mirror 13 is set at 45 degrees. In this arrangement, since the optical axis 3a and the optical axis 12a of the laser beam coincide, it is possible to allow the origin (the point at which X=0) on the screen 5 to coincide with the optical axis 3a of the CCD camera 3 only by projecting a spot of laser light onto the origin on the screen 5.

It is possible to verify that the origin on the screen 5 corresponds to the origin on the image plane of the CCD camera 3 by verifying that the coordinate of a point at which the laser beam that is reflected from the screen 5 and passes through the half mirror is incident on the image plane of the CCD camera 3 is present at the origin on the image plane.

It is also possible to verify that the screen 5 is perpendicular to the optical axis 3a of the CCD camera 3 by verifying that the coordinate of a point at which the laser beam that is strongly regularly reflected from the screen 5 and passes through the half mirror 13 is incident on the image plane of the CCD camera 3 is present at the origin on the image plane.

Figure 4:
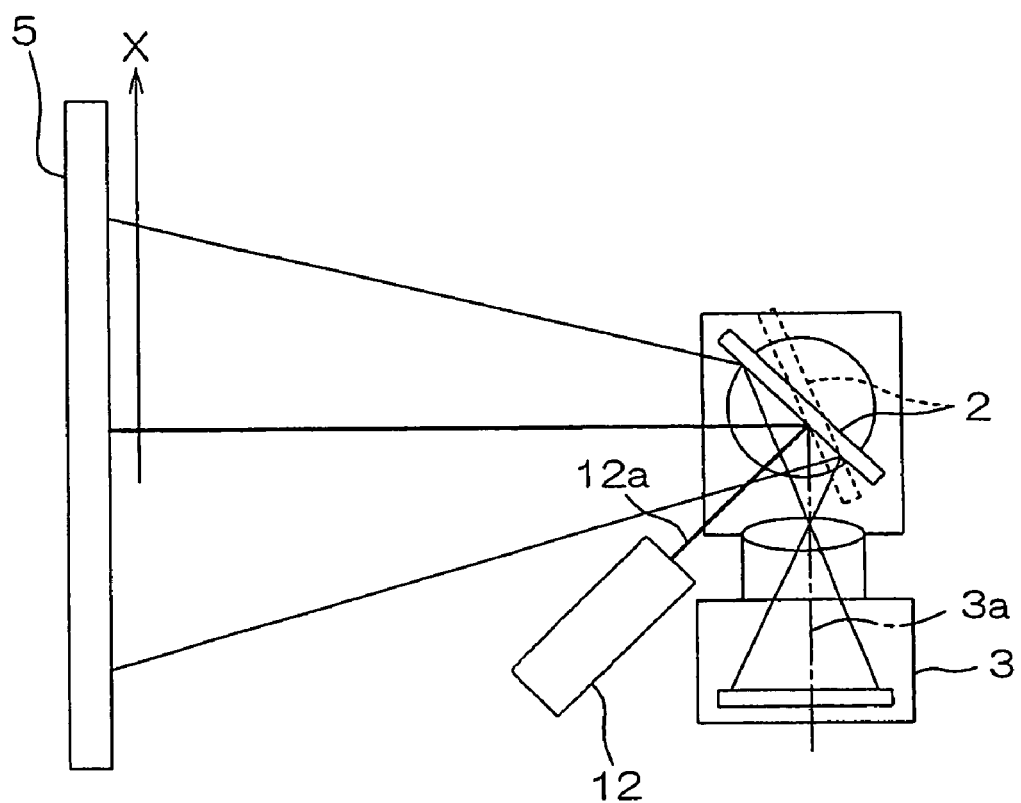
FIG. 4 is a block diagram illustrating the configuration of a measurement system for evaluating moving image quality of displays arranged such that laser light is directed from a laser oscillating apparatus 12 obliquely to a galvanometer mirror 2.

FIG. 4 shows an arrangement in which a laser oscillating apparatus 12 is fixed with respect to the galvanometer mirror 2 so that the laser beam is directed at a predetermined angle to strike the galvanometer mirror 2 and the light reflected therefrom strikes the origin on the screen 5. The angle of the galvanometer mirror 2, as indicated by the solid line, is accurately set so that when the angle of the galvanometer mirror 2 is 45 degrees, the optical axis 3a of the CCD camera 3 coincides with the optical axis 12a of the laser beam when the angle of the galvanometer mirror 2 is rotated at a predetermined angle as shown by the broken line. As in FIG. 3, also in this arrangement, since the optical axis 3a and the optical axis 12a of the laser beam coincide, it is possible to allow the origin (the point at which X=0) on the screen 5 to coincide with the optical axis 3a of the CCD camera 3 only by projecting a spot of laser light onto the origin on the screen 5.

The relationship between angular velocity of the galvanometer mirror 2 and moving velocity of the measuring pattern is now determined.

Figure 5:
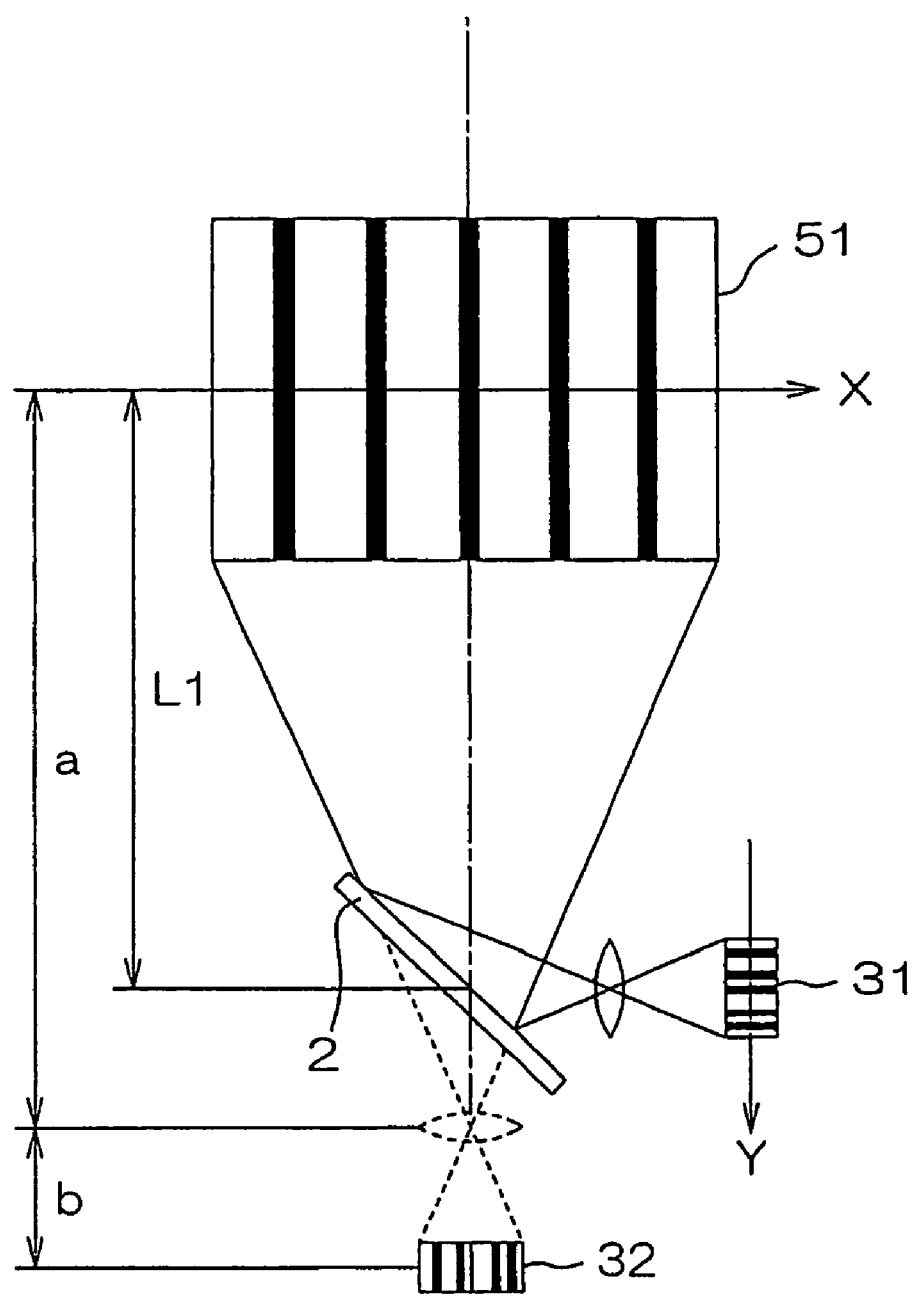
FIG. 5 is a plan view showing the positional relationship between a detector plane 31 of a CCD camera and a screen 51 of a display device subject to evaluation.

FIG. 5 is a plan view illustrating a positional relationship between a detector plane 31 of the CCD camera 3 and a screen 51 of the display device subject to evaluation. Light from the screen 51 is reflected at the galvanometer mirror 2 to be incident on the lens of the CCD camera 3 and is detected at the detector plane 31 of the CCD camera 3. A mirror image 32 of the detector plane 31 of the CCD camera 3 is drawn by broken lines on the rear side of the galvanometer mirror 2.

Let the distance along the optical path between the display device subject to evaluation and the galvanometer mirror 2 be represented by L1. Let the distance along the optical path between the display device subject to evaluation and the lens be represented by a, and the distance from the lens to the detector plane 31 be represented by b. If the focal length of the lens is known, the relationship between a and b can be found by the following equation:

$$1/f = 1/a + 1/b$$

Assume that a coordinate of the screen 51 of the display device subject to evaluation in the scanning direction is X, and that a coordinate of the detector plane 31 of the CCD camera 3 in the scanning direction is Y. Set X0, the origin of X, at the center of the screen 51 of the display device subject to evaluation, and set Y0, the origin of Y, at the point corresponding to X0. If the magnification of the lens of the CCD camera 3 is M, $$X = -MY (M>0)$$

The magnification M is expressed using the aforesaid a and b as follows:

$$M = b/a$$

If the galvanometer mirror 2 is rotated by an angle θ, the corresponding position on the screen 51 of the display device subject to evaluation deviates with respect to the rotation axis of the galvanometer mirror 2 by an angle of 2θ. The coordinate X on the screen 51 of the display device subject to evaluation that corresponds to the angle 2θ is expressed as follows:

$$X = L1 \tan 2\theta$$

A modification of the equation above gives the following equation:

$$\theta = \arctan(X/L1)/2$$

The equation $X = L1 \tan 2\theta$ is differentiated by time t to give the following equation:

$$dX/dt = 2L1(d\theta/dt)\cos^{-2}(2\theta)$$

Accordingly, if the measuring pattern on the screen 51 of the display device subject to evaluation moves at a speed of dX/dt, the condition for a detection coordinate on the detector plane 31 of the CCD camera 3 to come to a standstill is that the galvanometer mirror 2 rotates at an angular velocity of dθ/dt as expressed by the following equation (a):

$$d\theta/dt = (dX/dt)\cos^2(2\theta)/(2L1) \tag{a}$$

If θ is a minute angle, $\cos^2(2\theta)$ can be assumed to be 1, therefore the equation above can be expressed as follows:

$$d\theta/dt = (dX/dt)/2L1 \tag{b}$$

Since the relationship between the voltage and angle of the galvanometer mirror 2 is given, the temporal variation of voltage for obtaining a static image can be found by this equation.

Now, examples of numerical values are described. Assume that L1=200 mm, the pixel pitch of the screen 51 of the display device subject to evaluation is 0.3 mm, the moving velocity of the measuring pattern is 10 pixels/frame, and the time for one frame is 16.7 ms. If the measuring pattern is located at the position of −15 mm at a time t=0, and the angle θ of the galvanometer mirror 2 at the time is −4.3 degrees, the relationship between the motion of the measuring pattern and the angle θ of the galvanometer mirror 2 with elapse of time is as shown in Table 1.

TABLE 1

| time (msec) | 0.0 | 16.7 | 33.3 | 50.0 | 66.7 | 83.3 | 100.0 | 116.7 | 133.3 | 150.0 | 166.7 |
|---|---|---|---|---|---|---|---|---|---|---|---|
| X1 (mm) | −15 | −12 | −9 | −6 | −3 | 0 | 3 | 6 | 9 | 12 | 15 |
| θ (degree) | −4.3 | −3.4 | −2.6 | −1.7 | −0.9 | 0.0 | 0.9 | 1.7 | 2.6 | 3.4 | 4.3 |

Accordingly, in order to follow the motion of the measuring pattern, the angle θ of the galvanometer mirror 2 is varied as in Table 1.

When the galvanometer mirror 2 is rotated at a predetermined angular velocity as described above, it is necessary to verify that the angular velocity is in fact the predetermined angular velocity. Therefore, a method for externally measuring the angular velocity of the galvanometer mirror 2 when it is rotated is described.

Figure 6:
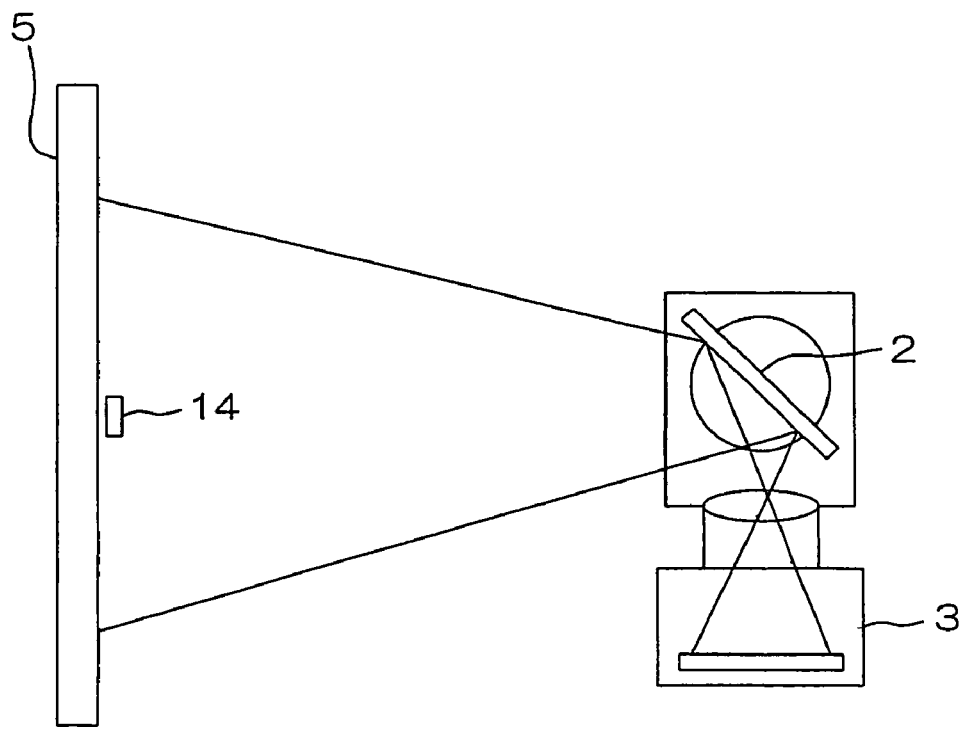
FIG. 6 is a block diagram illustrating the configuration of a measurement system for evaluating moving image quality of displays equipped with a LED light source 14.

FIG. 6 is a block diagram showing the configuration of a measurement system for evaluating moving image quality of displays. While a measurement system for evaluating moving image quality of displays is shown as in FIG. 1, the photodetector 4, computer control section 6, galvanometer mirror drive controller 7, image signal generator 9, liquid crystal monitor 10, and laser oscillating apparatus 2 are not diagramed in FIG. 6.

The screen 5 is provided with a LED light source 14 that illuminates the screen 5 by spot illumination. Any light source other than the LED light source 14 may be used as long as it is able to illuminate the screen 5 by spot illumination. For example, the laser oscillating apparatus 12 in FIG. 2 may be employed.

When the galvanometer mirror 2 is rotated by an angle θ with the coordinate X of a point on the screen 5 illuminated by spot illumination being fixed, the coordinate Y on the image plane 31 of the CCD camera 3 is expressed as follows:

$$Y = b \tan(2\theta)$$

This equation is differentiated by time to give the following equation:

$$dY/dt = 2b[\cos^{-2}(2\theta)](d\theta/dt)$$

Given the angular velocity of the galvanometer mirror 2 as ω=dθ/dt, the equation above is expressed as follows:

$$dY/dt = 2b[\cos^{-2}(2\theta)]\omega$$

If θ is a minute angle, $\cos^{-2}(2\theta)$ can be assumed to be 1. The equation above is therefore expressed as follows:

$$dY/dt = 2b\omega \tag{c}$$

Figure 7:
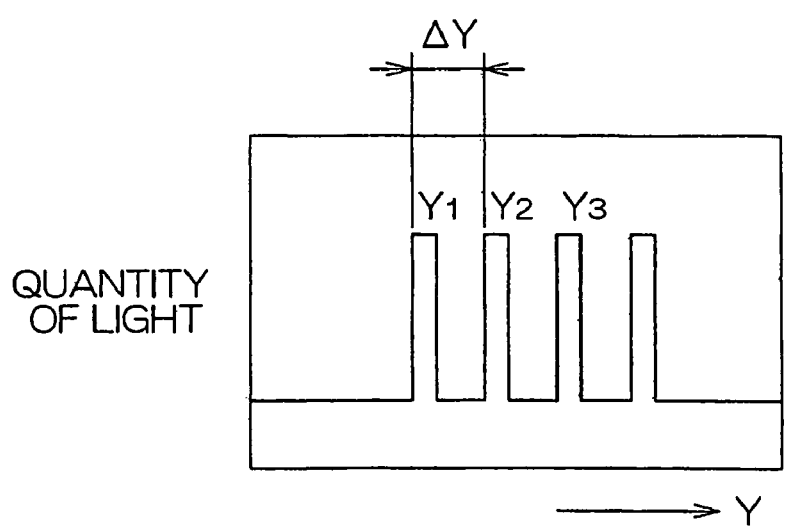
FIG. 7 illustrates a pattern of images repeatedly formed on the image plane 31 of the CCD camera 3 when the LED light source 14 is operated to emit a pulsed light.

With the CCD camera 3 set to a sufficiently long exposure time and the galvanometer mirror 2 being rotated at an angular velocity of ω, the LED light source 14 is operated to emit a pulsed light at regular cycles Δt. As a result, an image is repeatedly formed on the image plane of the CCD camera 3 at intervals of ΔY as shown in FIG. 7. From the equation (c) above, the relationship between the interval ΔY and the regular cycle Δt is expressed as follows:

$$\Delta Y = 2b\omega\Delta t \tag{d}$$

The coordinate Yn (n is an integer) of each pulse with respect to the origin is expressed as follows:

$$Yn=2b\omega tn$$

$$tn=n\Delta t$$

Figure 8:
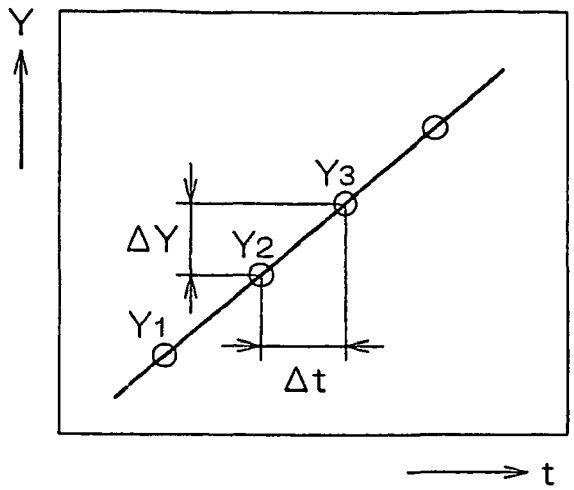
FIG. 8 is a graph showing a coordinate Yn of a pulse image formed on the image plane 31 of the CCD camera 3 plotted with respect to time t.

When the coordinates Yn of the pulse images formed on the image plane 31 of the CCD camera 3 are plotted with respect to time t, the graph in FIG. 8 is obtained. The inclination of this graph is determined, which is expressed as dY/dt and is substituted into the equation (c) above, thereby the angular velocity ω of the galvanometer mirror 2 can be measured.

Next, the LED light source 14 is continuously lit and the spot is shot by the CCD camera 3 with the galvanometer mirror 2 being kept still. As a result, as shown in FIG. 9, an image having a width corresponding to the sum of the width SPT of the LED spot and the width of blurring of an optical system such as the lens appears on the image plane of the CCD camera 3.

Subsequently, with the CCD camera 3 set to a certain exposure time and the galvanometer mirror 2 being rotated at a known angular velocity ω, the spot is shot. As a result, as shown in FIG. 10, an image having a width corresponding to the sum of the width SPT of the LED spot, the width of blurring of an optical system such as the lens and a distance ΔY traveled by the image during the exposure time Δt of the CCD camera 3 appears on the image plane of the CCD camera 3.

Figure 9:
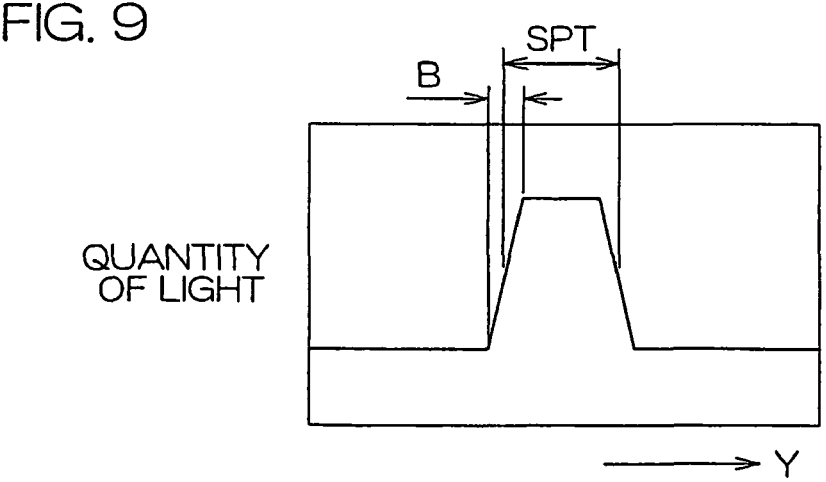
FIG. 9 illustrates an image of a light spot of the LED light source 14 taken by the CCD camera 3 when the LED light source 14 is continuously lit and the galvanometer mirror 2 is kept still.
Figure 10:
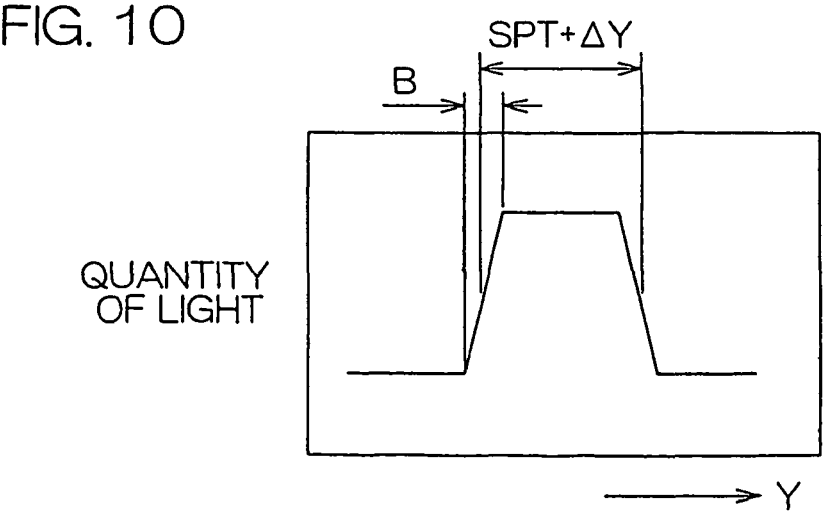
FIG. 10 illustrates an image formed on the image plane of the CCD camera 3 when a spot is shot with the galvanometer mirror 2 being rotated at a known angular velocity ω and the CCD camera 3 set to a certain exposure time.

By subtracting the width of the image of FIG. 9 from the width of the image of FIG. 10, the distance ΔY on the image plane that corresponds to the exposure time of the CCD camera 3 can be measured. A modification of the equation (d) above gives the following equation:

$$\Delta t=\Delta Y/2b\omega \quad (e)$$

Accordingly, by substituting ΔY and the angular velocity ω into the equation (e), the exposure time Δt can be measured.

<Evaluation Method>

Figure 11:
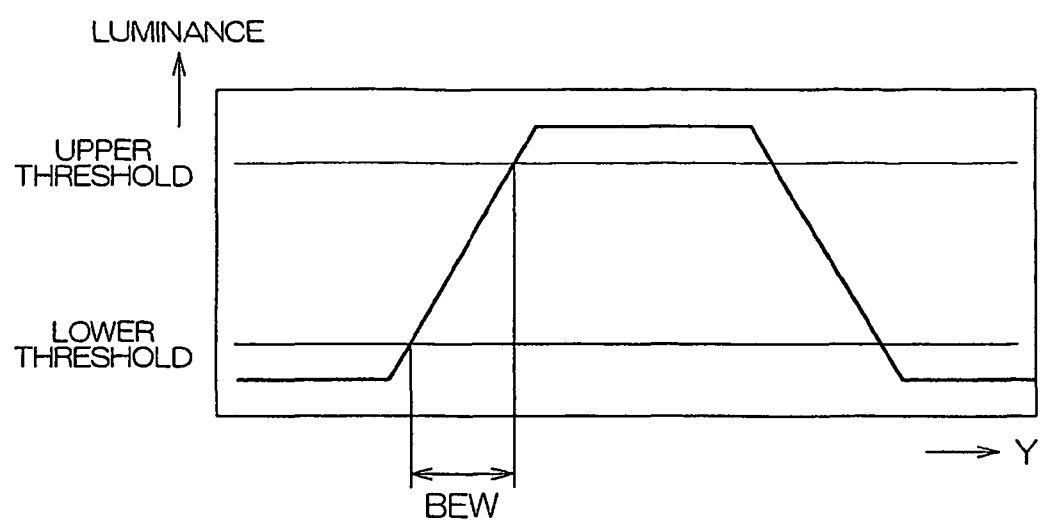
FIG. 11 illustrates a luminance distribution in the scanning direction of a static image captured by the CCD camera 3.

Assume that the measuring pattern for evaluation displayed on the screen 51 of the display device subject to evaluation is a zonal measuring pattern extending over a certain length in the scanning direction with a luminance greater than that of the background. As described above, when the galvanometer mirror 2 is rotated at an angular velocity ω satisfying the equation (a) or equation (b) so as to correspond to the movement of the measuring pattern on the screen 51 of the display device subject to evaluation, a static image is captured by the CCD camera 3. A luminance distribution in the scanning direction of the static image captured by the CCD camera 3 is shown in FIG. 11. The portion where luminance exceeds the upper threshold is recognized as within the measuring pattern, and the portions where luminance is lower than the lower threshold are recognized as out of the measuring pattern. The length BEW of the intermediate portion between the upper threshold and lower threshold represents a "Blurred Edge Width." The BEW serves as a function of the moving velocity dX/dt on the screen 5 of the display device subject to evaluation. The faster the dX/dt is, the longer is the BEW, and the slower the dX/dt is, the shorter is the BEW. Accordingly, when BEW is plotted with respect to the moving velocity, and the inclination thereof (in units of time) is defined as N_BEW, evaluation of moving image quality can be performed using N_BEW. Meanwhile, there is another method for evaluation of moving image quality which uses MTF (Modulation Transfer Function) as the evaluation value to express blurring of an image.

<Rotation Control of Galvanometer Mirror>

As stated previously, it is assumed that the measuring pattern is a zonal measuring pattern extending over a certain length in the scanning direction with a luminance. Now, assume that the measuring pattern moves at a uniform velocity on the screen 5 of the display device subject to evaluation. Hereinafter, it is assumed that the luminance of the measuring pattern is lower than that of the background.

Figure 12:
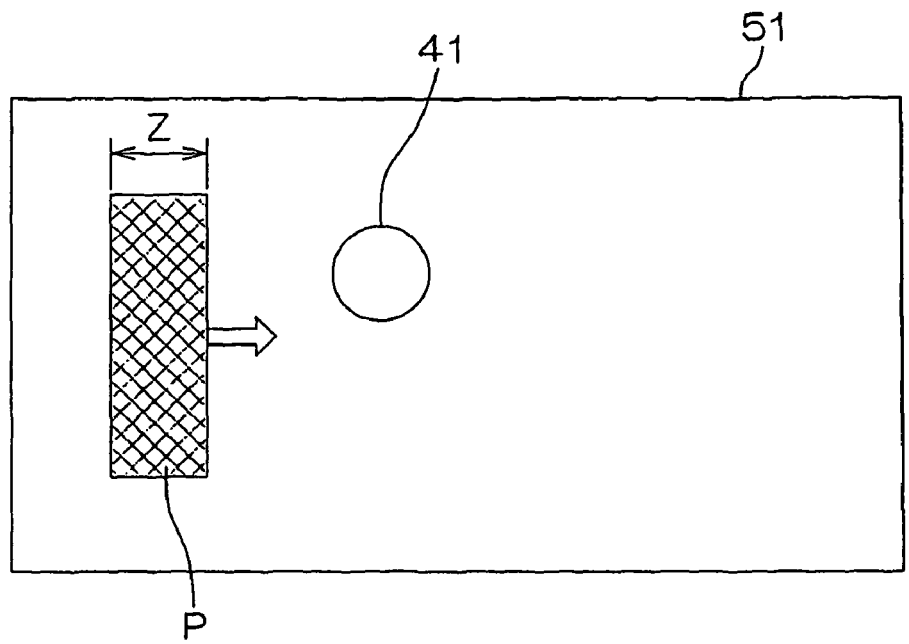
FIG. 12 illustrates a measuring pattern P moving on the screen and a detection range 41 of a photodetector.
Figure 13:
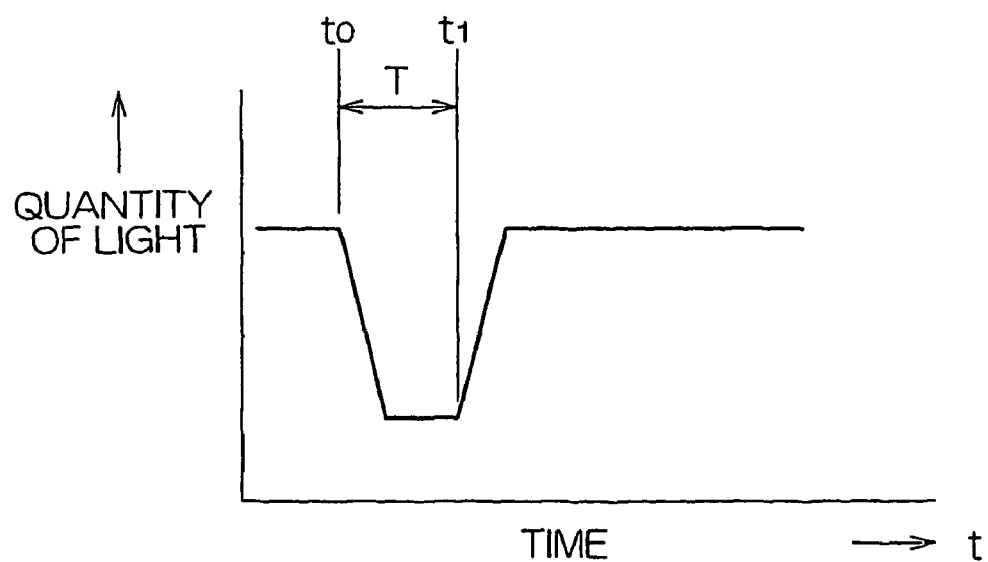
FIG. 13 is a waveform diagram of a detection signal of the photodetector.

FIG. 12 illustrates a measuring pattern P moving on the screen 5 and a detection range 41 of the photodetector 4. As described previously, since the detection signal of the photodetector 4 corresponds to the average luminance in the detection range 41 on the screen 5, when the measuring pattern passes through the detection range of the photodetector 4, the detection signal changes as shown in FIG. 13. Since the detection value begins to decrease at an edge of the detection range 41, the computer control section 6 may be adapted to provide a rotation signal to the galvanometer mirror 2 through the galvanometer mirror controller 7 triggered by the time t0 at which the detection value begins to decrease.

A period of time T from the time at which the detection value begins to decrease to the time at which the detection value begins to increase represents a time for the passage of the measuring pattern. If the width Z of the measuring pattern P is known, Z/T corresponds to the moving velocity dX/dt of the measuring pattern P. Accordingly, by calculating Z/T and substituting the obtained value into the equation (a) or equation (d), the angular velocity of the galvanometer mirror 2 can be specified.

Figure 14:
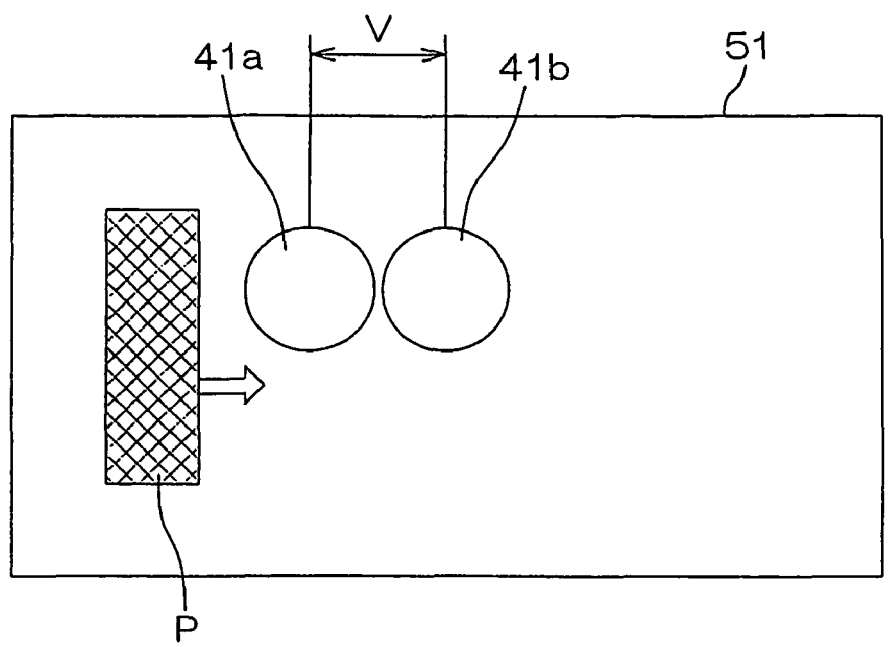
FIG. 14 illustrates a measuring pattern P moving on the screen and detection ranges 41a and 41b of the photodetector when it has two detection ranges.
Figure 15:
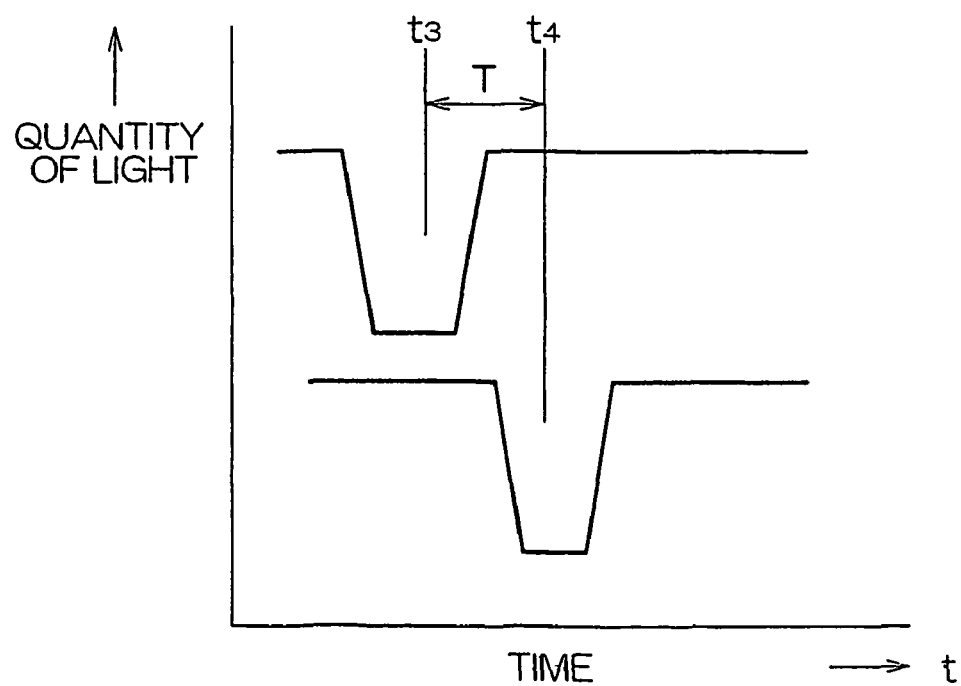
FIG. 15 is a waveform diagram of a detection signal of the photodetector.

FIG. 14 illustrates a case where two photodetectors 4 each have a detection range 41a and 41b. When the measuring pattern P passes through the respective detection ranges 41a and 41b of the photodetectors 4, a valley appears in each of the detection signals of the two photodetectors 4 as shown in FIG. 15. A rotation signal is given to the galvanometer mirror 2 through the galvanometer controller 7, which is triggered by the time t3 at which the measuring pattern passes through the first detection range. When the time at which the measuring pattern passes through the next detection range is represented by t4, T=t4−t3 represents the time for the passage of the measuring pattern P. If the distance V between the two detection ranges 41a and 41b is known, the moving velocity of the measuring pattern P can be determined. Accordingly, the angular velocity of the galvanometer mirror 2 can be set based on the moving velocity of the measuring pattern P.

Figure 16:
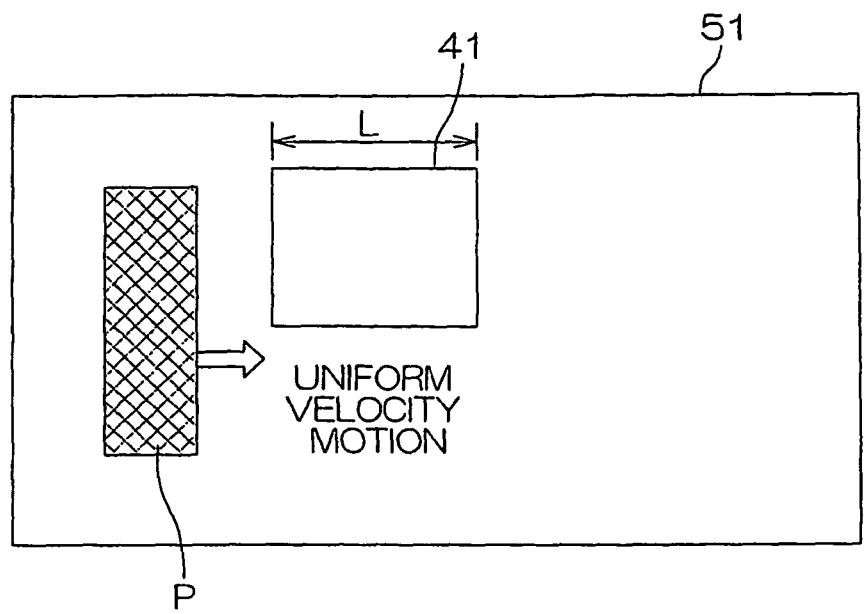
FIG. 16 illustrates a measuring pattern P moving on the screen and a detection range 41 of the photodetector when it is an analog position sensor.
Figure 17:
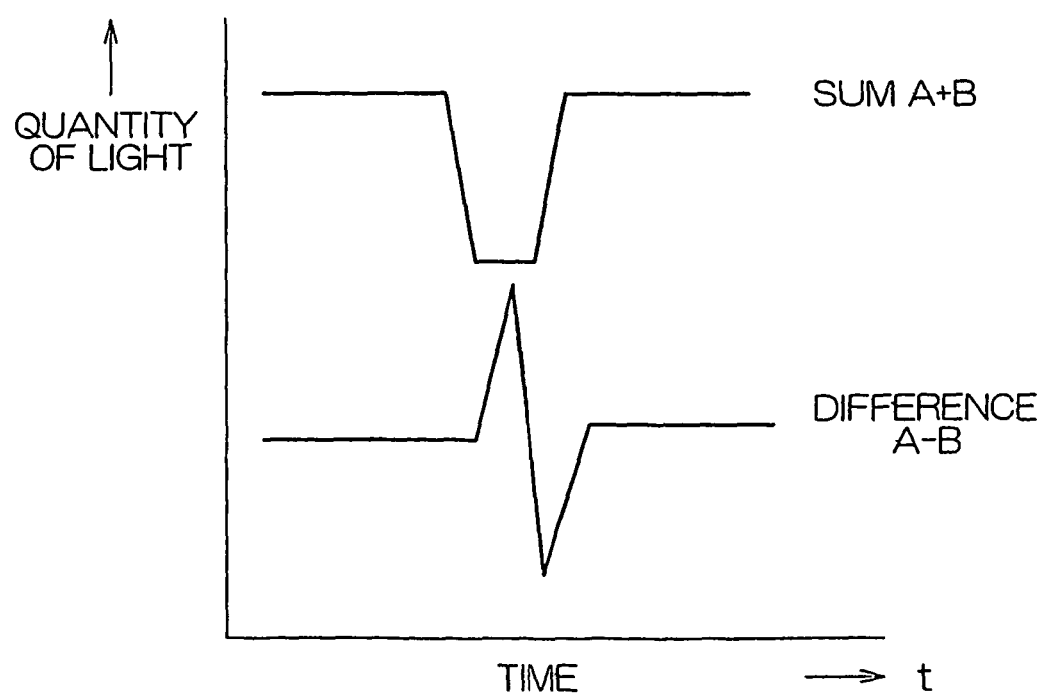
FIG. 17 is a waveform diagram of a detection signal of the photodetector.

FIG. 16 illustrates a case where an analog position sensor is used as the photodetector 4. The position sensor detects an area with a uniform length L, and outputs the sum of and the difference between a light quantity A and a light quantity B detected at edges of the area. When the moving image of the measuring pattern passes through the position sensor, a sum signal and a difference signal appear as shown in FIG. 17. Based on the two signals, the following calculation is performed:

$$L(\text{sum signal}+\text{difference signal})/2(\text{sum signal})=LA/(A+B)$$

By this calculation, the position of the measuring pattern P from one edge part of the area can be determined. The passing time and the passing speed of the measuring pattern P can be calculated based on the position of the measuring pattern P.

FIGS. 18(a) to 18(d) are graphs showing temporal transitions of various physical quantities observed as a result of the rotation control of the galvanometer mirror 2 described so far. The horizontal axis represents time.

Figure 18A:
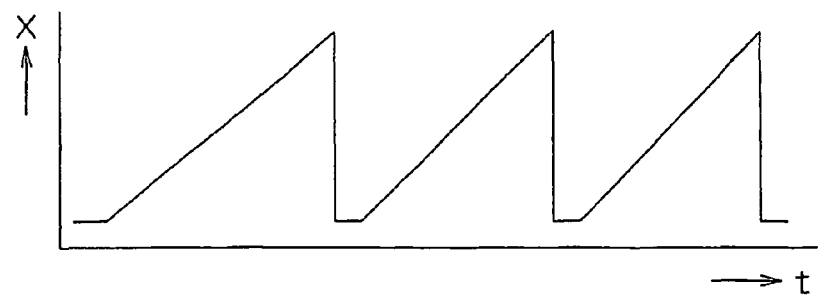
FIGS. 18(a)-18(d) are graphs showing temporal transitions of various physical quantities as a result of controlling rotation of the galvanometer mirror 2, including.
Figure 18B:
Figure 18C:
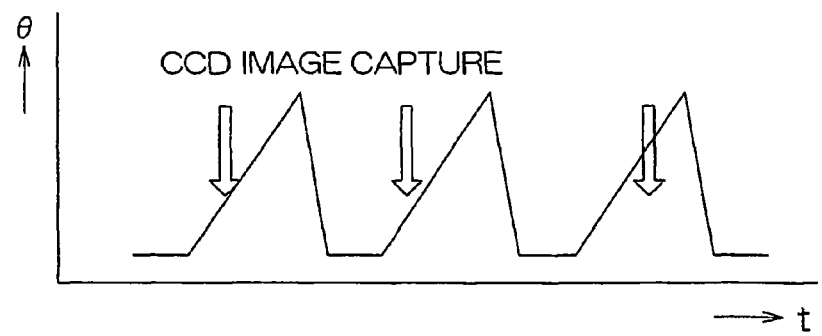
Figure 18D:
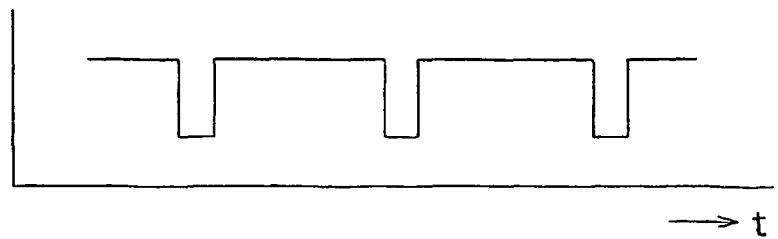

FIG. 18(a) is a graph showing the motion of the measuring pattern P on the screen 5 of the display device subject to evaluation. The vertical axis indicates the coordinate X of an arbitrary point (e.g. the center) of the measuring pattern P. FIG. 18(b) shows times at which a trigger signal is generated in the computer control section 6. The times of occurrence of the trigger signal are interlocked with the starting points of the motion of the measuring pattern P. FIG. 18(c) is a graph showing a temporal transition of the rotation angle θ of the galvanometer mirror 2 that rotates in response to receipt of a rotation signal. The hollow arrows indicate times at which CCD image capturing is effected. FIG. 18(d) is a graph showing a temporal transition of the exposure amount at the detector plane 31 of the CCD camera 3. Since the color of the measuring pattern P is arranged to be closer to black than that of the background, the exposure values at the times when the measuring pattern P is captured are less than the exposure values when the measuring pattern P is not captured.

As discussed so far, in this embodiment, the galvanometer mirror 2 can be triggered to rotate based on a detection signal of the measuring pattern P included in the moving image displayed on the screen 5, and also, based on assumption that the measuring pattern P is moving at a uniform moving velocity, the galvanometer mirror 2 can be controlled to rotate at an angular velocity corresponding to the moving velocity of the measuring pattern P. Accordingly, images that trace the motion of the moving image can be obtained on the detector plane 5 of an image sensor without resorting to electrical synchronization with moving image signals.

<Other Motions of Moving Image>

Even when the moving velocity of the measuring pattern P is not uniform, so long as the position of the measuring pattern P is predictable as a time function, it is possible to trigger the galvanometer mirror 2 to rotate based on a detection signal of the photodetector 4.

Figure 19:
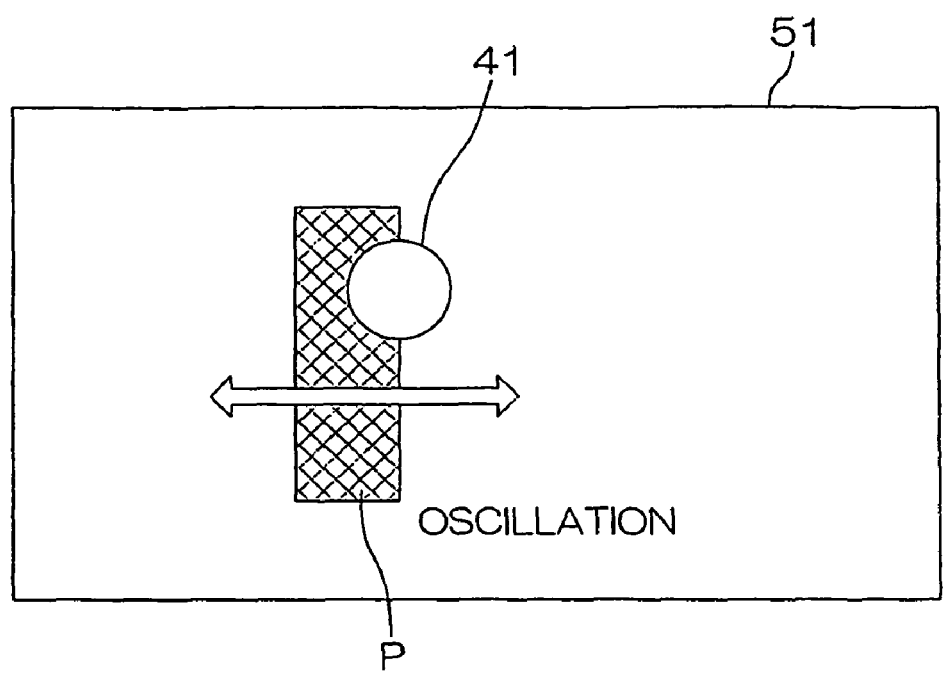
FIG. 19 illustrates a measuring pattern P oscillating with a sinusoidal motion and a detection range 41 of the photodetector.
Figure 20:
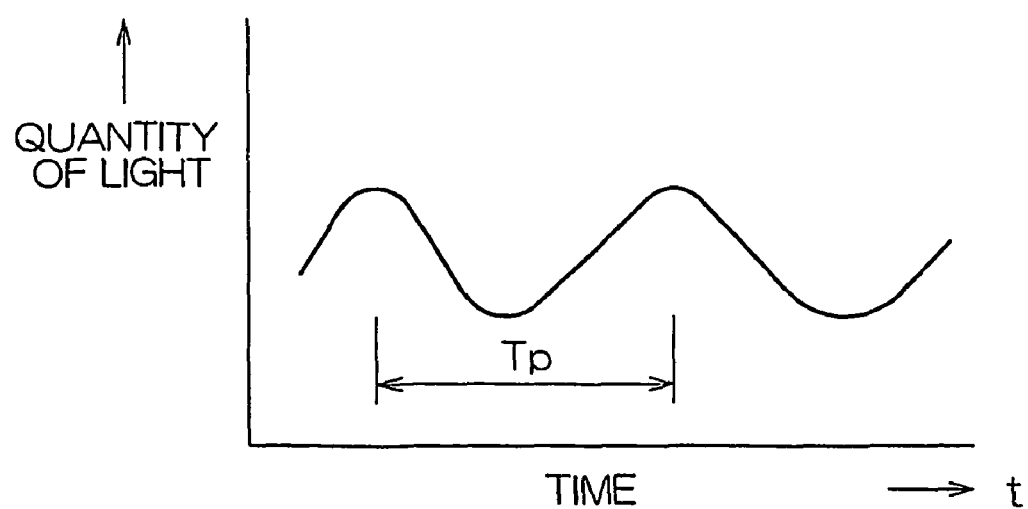
FIG. 20 is a waveform diagram of a detection signal of the photodetector.

FIG. 19 illustrates a measuring pattern P oscillating with a sinusoidal motion and a detection range 41 of the photodetector 4. The amplitude of the oscillation of the measuring pattern P is assumed to include at least a part of the detection range 41 of the photodetector 4. The detection signal that appears on the photodetector 4 as a result of the oscillation of the measuring pattern P formed a waveform of an approximate sine wave. The galvanometer mirror 2 can be triggered to reciprocate at the time of a peak or valley of the wave.

When the cycle of the oscillation of the measuring pattern P is not given from the beginning, the cycle of reciprocation of the galvanometer mirror 2 may be adjusted to the cycle Tp of the detection signal. When the amplitude of the oscillation of the measuring pattern P is not given from the beginning, the amplitude of reciprocation of the galvanometer mirror 2 may be gradually increased or gradually decreased so as to measure a response as shown in FIG. 11 so that the amplitude of reciprocation of the galvanometer 2 at a time when BEW becomes smallest is adopted.

Figure 21:
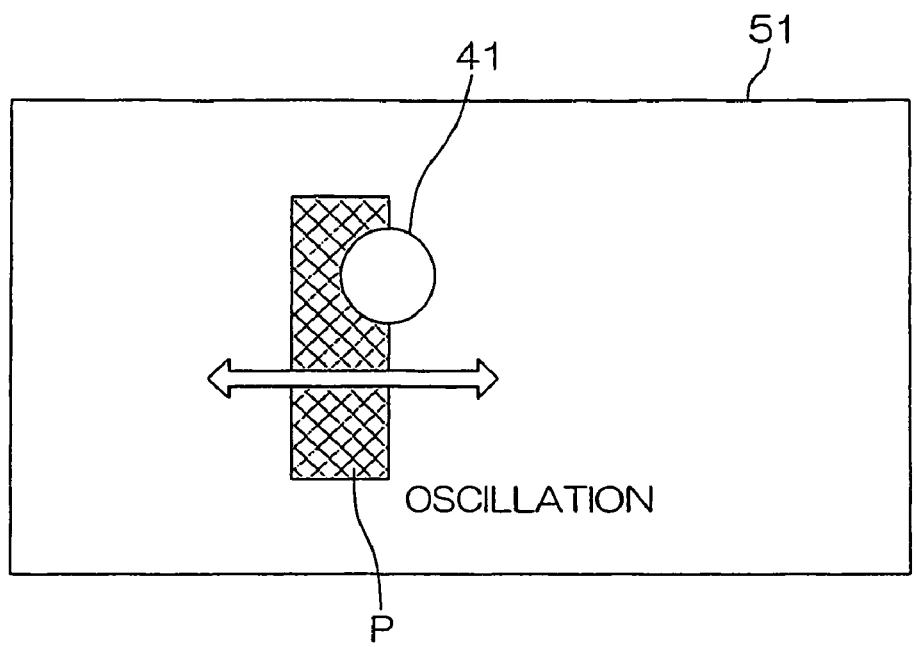
FIG. 21 illustrates a measuring pattern P oscillating to yield a rectangular waveform.
Figure 22:
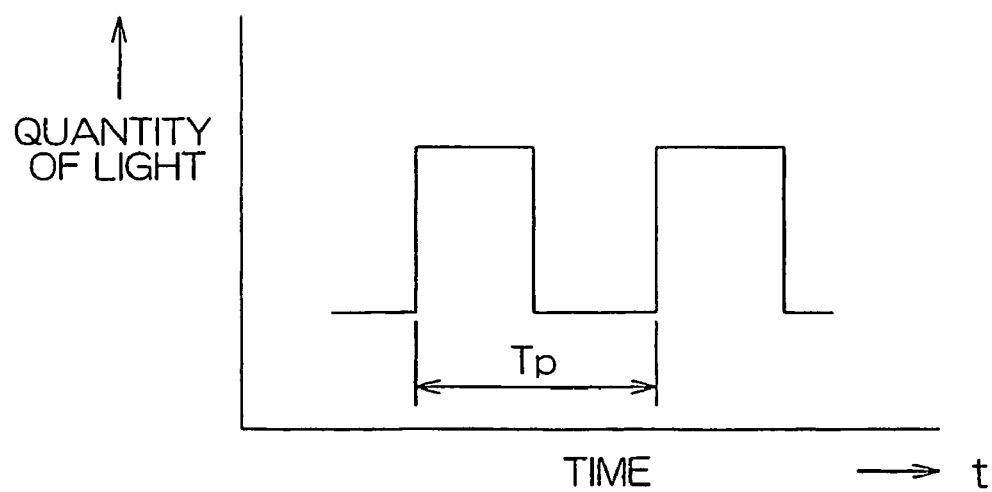
FIG. 22 is a waveform diagram of a detection signal of the photodetector.

FIG. 21 illustrates a measuring pattern P oscillating to yield a rectangular waveform and a detection range 41 of the photodetector 4. The amplitude of the oscillation of the measuring pattern P is assumed to include at least a part of the detection range 41 of the photodetector 4. The detection signal that appears on the photodetector 4 as a result of the oscillation to yield a rectangular waveform of the measuring pattern P forms an approximate rectangular wave as shown in FIG. 22. The galvanometer mirror 2 can be triggered to rotate at the time of a rise or decay of the wave.

When the cycle of the oscillation of the measuring pattern P is not given from the beginning, it may be adjusted to the cycle Tp of the detection signal. The cycle of reciprocation of the galvanometer mirror 2 can therefore be determined. When the amplitude of the oscillation is not given from the beginning, the amplitude of reciprocation of the galvanometer mirror 2 may be gradually varied so as to measure a response as shown in FIG. 11 so that the amplitude of reciprocation of the galvanometer 2 at a time when BEW becomes smallest is adopted. A rapid motion as this can be followed because of the excellent rotational response of the galvanometer mirror 2. Because of the large moment of inertia, it is difficult to control a motor to perform such a motion to yield a rectangular waveform.

Figure 23:
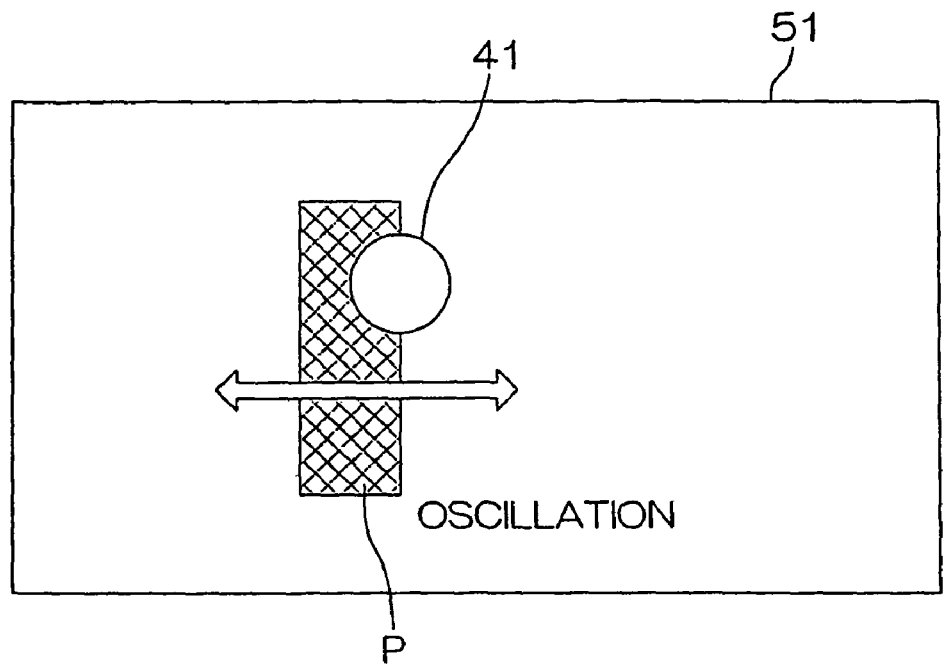
FIG. 23 illustrates a measuring pattern P oscillating among three positions and a detection range 41 of the photodetector.
Figure 24:
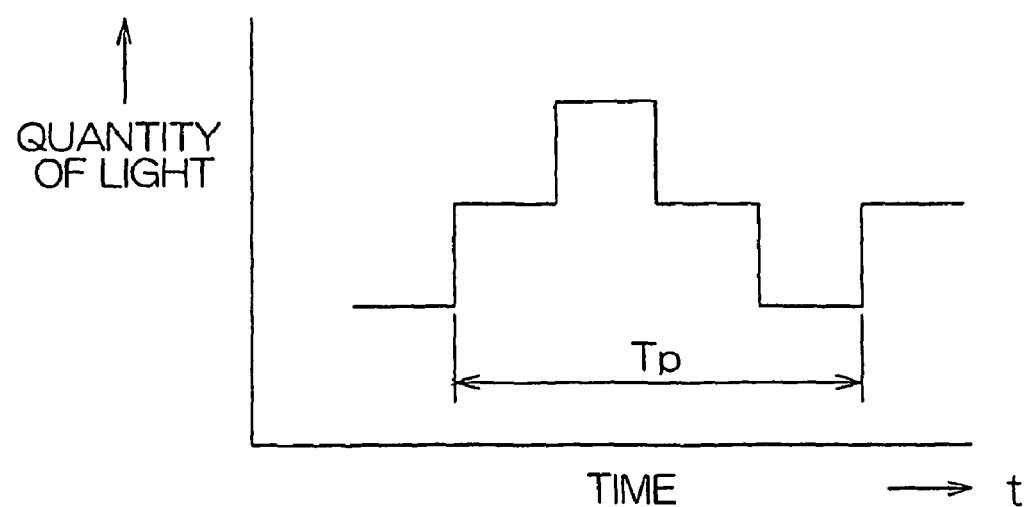
FIG. 24 is a waveform diagram of a detection signal of the photodetector.

FIG. 23 illustrates a measuring pattern P oscillating among three locations and a detection range 41 of the photodetector 4. The amplitude of the oscillation of the measuring pattern P is assumed to include at least a part of the detection range 41 of the photodetector 4. The detection signal that appears on the photodetector 4 as a result of the oscillation among three locations of the measuring pattern P reciprocates in the form of a three-stepped rectangular waveform as shown in FIG. 24. The galvanometer mirror 2 can be triggered to rotate at the time of a rise or decay of the wave.

When the cycle of the oscillation of the measuring pattern P is not given from the beginning, it may be adjusted to the cycle Tp of the detection signal. The cycle of reciprocation of the galvanometer mirror can therefore be determined. When the amplitude of the oscillation is not given from the beginning, the amplitude of reciprocation of the galvanometer mirror 2 may be gradually varied so as to measure a response as shown in FIG. 11 so that the amplitude of reciprocation of the galvanometer 2 at a time when BEW becomes smallest is adopted.

Incidentally, in the present invention as described so far, the motion of the measuring pattern is one-dimensional. For this reason, images formed on the detector plane of the CCD camera 3 have rectangular shapes. Since no information is included in the direction perpendicular to the moving direction of the measuring pattern, by taking a sum of pixel signals on the detector plane of the CCD camera in a direction perpendicular to the moving direction of the measuring pattern, the noise component of each pixel signal can be reduced, thereby the detection sensitivity can be improved.

In addition, using a color CCD camera as the CCD camera allows image to be displayed on the detector plane color by color, and color difference can be measured by calculating the difference in N_BEW of each color. Alternatively, measurement by the use of a black and white CCD camera and a plural number of exchangeable color filters has the same effect as the use of a color CCD camera.

While some embodiments of the present invention have been described above, implementation of the invention is not restricted to the above described embodiments. For example, instead of the arrangement using a galvanometer mirror, the arrangement may be such that a mirror is attached to the rotation axis of a stepping motor or a servomotor. In addition, as discussed previously, instead of the arrangement where the galvanometer mirror and the CCD camera are provided independently, a CCD camera itself may be rotationally driven by a rotation drive motor. Besides these, various other modifications may be made within the scope of the invention.

The invention claimed is:

1. A measurement system for evaluating moving image quality of displays based on the motion of a measuring pattern displayed on a screen of a display device subject to evaluation, the system comprising:
   a rotatable mirror;
   an image sensor for taking an image of the screen through the mirror;
   a rotation drive section for rotationally driving the mirror;

a photodetector having a detection range covering a part of the screen; and a control section connected to the photodetector and the rotation drive section, wherein the control section outputs a trigger signal to the rotation drive section for triggering the rotation drive section to rotate based on a detection signal from the photodetector outputted at a time when the photodetector detects the measuring pattern displayed on the screen, and the control section outputs a control signal to the rotation drive section so that the mirror rotates to follow the motion of the measuring pattern.

2. The measurement system for evaluating moving image quality of displays according to claim 1, wherein the measuring pattern moves on the screen at a uniform velocity.

3. The measurement system for evaluating moving image quality of displays according to claim 1, wherein the control section calculates the moving velocity of the measuring pattern based on a detection signal from the photodetector.

4. The measurement system for evaluating moving image quality of displays according to claim 3, wherein the control section calculates the moving velocity of the measuring pattern on any of the following conditions (a) to (c):

(a) that a width of the measuring pattern is known;

(b) that the photodetector has a plurality of detection ranges; and (c) that the photodetector has a plurality of detection ranges and takes a difference in optical intensity signal between each of the detection ranges.

5. The measurement system for evaluating moving image quality of displays according to claim 1, wherein the measuring pattern performs reciprocating oscillation on the screen.

6. The measurement system for evaluating moving image quality of displays according to claim 5, wherein the control section triggers the rotation drive section to rotate based on a time at which a peak value or a bottom value of a detection signal of the photodetector is detected or a time at which a rise or decay in a detection signal is detected.

7. The measurement system for evaluating moving image quality of displays according to claim 5, wherein the control section determines a rotation cycle for the rotation drive section based on a cycle of a detection signal of the photodetector.

8. The measurement system for evaluating moving image quality of displays according to claim 1, wherein a rotatable camera and a rotation drive section for rotationally driving the camera are used instead of the combination of a rotatable mirror, an image sensor for taking an image of the screen through the mirror and a rotation drive section for rotationally driving the mirror.

9. The measurement system for evaluating moving image quality of displays according to claim 1, further comprising an illumination apparatus for illuminating the screen of the display device subject to evaluation by spot illumination, wherein the installation position and the angle of a illumination optical axis of the illumination apparatus are fixed with respect to both the photodetector and the rotation drive section.

10. The measurement system for evaluating moving image quality of displays according to claim 1, further comprising an illumination apparatus for illuminating the screen of the display device subject to evaluation with repetitive pulses of light, wherein the control section measures an angular velocity of the mirror by measuring a distance between images of illumination light pulses projected from the illumination apparatus that are formed on a detection screen of the photodetector during rotation of the mirror.

11. The measurement system for evaluating moving image quality of displays according to claim 1, further comprising an illumination apparatus for illuminating the screen of the display device subject to evaluation, wherein the control section measures an exposure time of the image sensor by measuring a width of an image of illumination light projected from the illumination apparatus that is formed on a detection screen of the image sensor during rotation of the mirror.

\* \* \* \* \*